(12) United States Patent
Slack et al.

(10) Patent No.: US 7,141,164 B2
(45) Date of Patent: Nov. 28, 2006

(54) SNAP LOCKING UNDERDRAIN BLOCK

(75) Inventors: David C. Slack, Tampa, FL (US);
Navin Kadakia, Bridgeville, PA (US)

(73) Assignee: Severn Trent Water Purification, Inc., Colmar, PA (US)

( * ) Notice: Subject to any disclaimer, the term of this patent is extended or adjusted under 35 U.S.C. 154(b) by 0 days.

(21) Appl. No.: 10/818,157

(22) Filed: Apr. 5, 2004

(65) Prior Publication Data

US 2005/0218061 A1    Oct. 6, 2005

(51) Int. Cl.
*B01D 24/38* (2006.01)
*B01D 24/46* (2006.01)

(52) U.S. Cl. .................. 210/232; 210/293
(58) Field of Classification Search ........... 210/232, 210/275, 279, 289, 291, 293
See application file for complete search history.

(56) References Cited

U.S. PATENT DOCUMENTS

| | | | |
|---|---|---|---|
| 3,956,134 A * | 5/1976 | Sturgill | 210/275 |
| 4,923,606 A | 5/1990 | Gresh et al. | 210/275 |
| 5,160,614 A | 11/1992 | Brown | 210/275 |
| 5,895,570 A * | 4/1999 | Liang | 210/232 |
| 6,143,188 A | 11/2000 | Jantsch, Sr. et al. | 210/794 |
| 6,325,931 B1 | 12/2001 | Roberts et al. | 210/293 |

* cited by examiner

*Primary Examiner*—Ivars C. Cintins
(74) *Attorney, Agent, or Firm*—D'Ambrosio & Associates, PLLC; Jo Katherine D'Ambrosio

(57) ABSTRACT

An underdrain block for a filter system comprises a housing that has of a top wall, a bottom wall, a first end wall, a second end wall, a first side wall, and a second side wall. The end walls and the side walls connect the top wall to the bottom wall. The bottom wall forms two lateral rows of support legs configured to straddle infrastructure of the filter system. One or more snap-locking mechanisms are located on the side walls so that adjacent underdrain blocks are interconnected by the locking mechanisms when snapped in place. In one embodiment, the first side wall comprises one or more tongue lugs and the second side wall comprises one or more groove lugs, each groove lug defines a groove for mating with the tongue lug so that adjacent housings are interconnected by the tongue-in-groove locking mechanisms when the tongue lugs are snapped into the grooves.

1 Claim, 3 Drawing Sheets

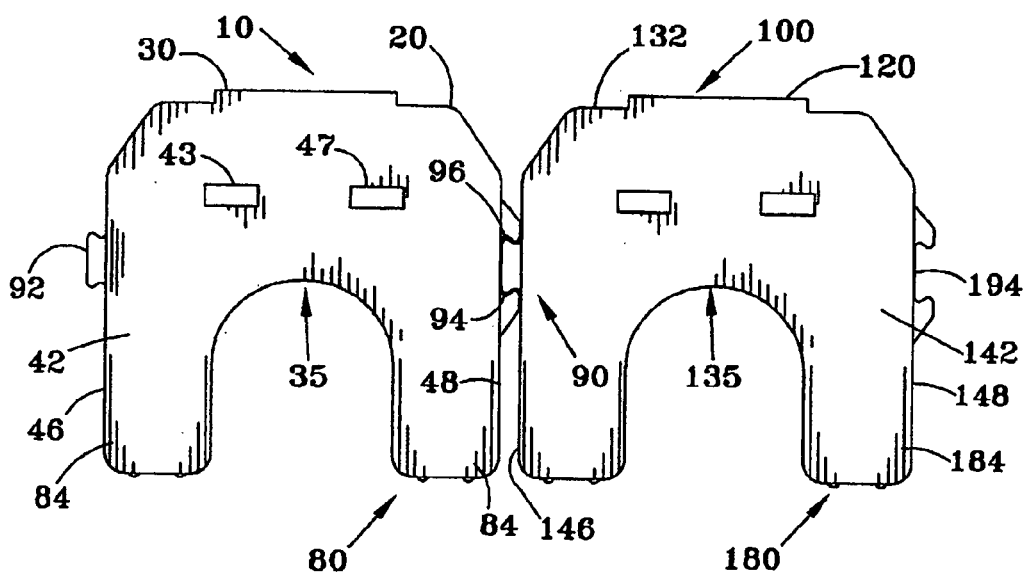
FIG.1
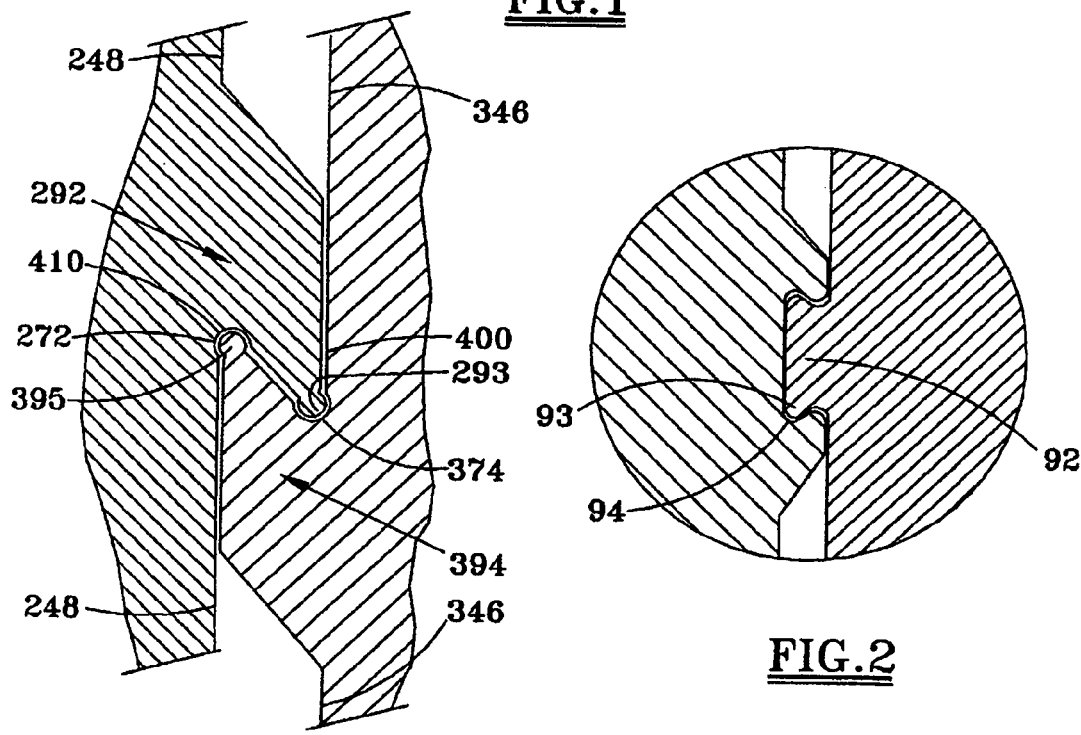
FIG.6
FIG.2

SNAP LOCKING UNDERDRAIN BLOCK

FIELD OF THE INVENTION

The present invention relates to an underdrain block for a filter media system. More particularly, the present invention relates to an interlocking underdrain block.

BACKGROUND

Water, wastewater, and industrial filtration units typically have an underdrain system for supporting filter media and to space the filter media apart from the bottom of the filter. In addition to providing support for the filter media, the underdrain system serves two primary purposes: to collect the filtered water that passes through the media and to uniformly distribute backwash water, backwash air, or a combination of both, across the filter.

Underdrain blocks are often made of pre-cast concrete blocks or concrete filled plastic jacketed blocks. The high-strength concrete blocks are placed side-by-side and end-to-end in the bottom of the filter to form a "false bottom". The blocks provide support for the filter media and are shaped to collect the filtered water that passes through the media.

In addition to shaping for collection, the blocks have conduits, commonly known as laterals, to allow for the passage of air or water used as a backwash. Piping, such as air headers, is part of the backwash air distribution system. Backwash water is brought into the system by flumes. Air headers bring in pressurized air, which is distributed into the laterals by pipes from the top of the headers, through the flumes and into the laterals.

During backwash operations, air is forced through the air distribution pipes and into the air laterals of the underdrain blocks. The pressurized air can be used as a backwash or combined with water for an air/water backwash. The pressurized air/water combination causes the filtered water to be passed upward through the media with sufficient velocity to prevent filter problems such as mud balls, filter cracking, agglomeration buildup on the media grains, and inactive areas within the filter. The underdrain blocks also act to physically separate the filter media from the air distribution pipes to prevent separate the air distribution pipes to prevent clogging of the orifices in the pipes by the finer particles of the filter media.

Problems can occur because the upward pressure against the blocks can be too forceful. Sometimes the pressure can fall within a range of 2 psi to 6 psi. Such strong pressure tends to dislocate the blocks, thereby allowing the filter media to drop into and damage the infrastructure. The cost of emptying the filter and realigning the blocks is high both in manpower and downtime of the filter.

U.S. Pat. No. 6,325,931 to Roberts discloses one example of an extruded underdrain block that is equipped with side rails. The side rails function to help align the blocks side-to-side in the filter basin. In one embodiment, the side rails on one side are offset from the side rails on the other side to allow the block to interlock with the adjacent block, eliminating the need for grout between the blocks.

U.S. Pat. No. 6,143,188 to Jantsch et al. discloses an underdrain block for a filter media system. The underdrain block is comprised of a top wall, a bottom wall, two side walls and plurality of interior walls. Jantsch also describes filling the gaps between the blocks with grout. The grout is used to hold the blocks together.

U.S. Pat. No. 4,923,606 to Gresh et al. Gresh et al. disclose underdrain blocks that are a combination of a plastic jacket and a concrete mold. The underdrain blocks of the '606 reference are used for both upflow and downflow filtration units. Thus the blocks provide for a distribution of both liquid and air during backwash operations.

U.S. Pat. No. 5,160,614 to Brown discloses an underdrain system comprised of a series of modular, interconnected air duct blocks. In the '614 reference, the row of air duct blocks extend transversely to a plurality of laterals. The laterals are defined by the connection of individual underdrain blocks in parallel adjacent rows. The air duct blocks are interconnected such that interiors of the separate air duct blocks are in fluid communication with one another to supply backwash gas through a single source of gas supply.

Because stability in the support surface is important during backwash, there is a need for an improved underdrain system that will limit the movement of the underdrain blocks during backwash procedures. Existing underdrain block designs offer either no features for backwash stability or only a limited amount of backwash stability through offset rails.

SUMMARY

The underdrain block of the present invention comprises blocks that interlock to promote stability of the block position during backwash procedures. The new and improved blocks are equipped with a snap-locking mechanism, which interconnects a row of underdrain blocks, substantially limiting the movement of the underdrain blocks during backwash procedures by providing the weight of the entire row to counteract the upward forces of the backwash.

One preferred underdrain block for a filter system comprises a housing having a top wall, a bottom wall, a first end wall, a second end wall, a first side wall, and a second side wall. The end walls and the side walls connect the top wall to the bottom wall. The bottom wall forms two lateral rows of support legs configured to straddle the infrastructure of the filter system. One or more snap-locking mechanisms are located on the side walls so that adjacent underdrain blocks are interconnected by the locking mechanisms when snapped in place. Preferably, the underdrain block comprises a housing that defines a cavity. The top wall defines an opening into the cavity, which may be filled with concrete to add weight to the block.

One or more snap-locking mechanisms are located on the side walls so that adjacent underdrain blocks are interconnected by the locking mechanisms when the locking mechanisms are snapped in place. In one embodiment, the locking mechanism comprises a tongue-in-groove snap lock. In this embodiment, the first side wall of the housing comprises one or more tongue lugs and the second side wall comprises one or more groove lugs, each groove lug defines a groove for mating with the tongue lug. Adjacent housings are interconnected and locked together by the tongue-in-groove locking mechanisms when the tongue lugs are snapped into the grooves.

Preferably, the tongue-in-groove lugs are integral with the side walls. The underdrain block can comprise a width that varies from the top wall to the bottom wall. The tongue-in-groove lugs are aligned on the side walls along a horizontal axis along a vertical plane at a point adjacent the greatest width of the block. Each tongue lug comprises a tongue machined to snap lock into the groove of the groove lug. In order to form a tight locking mechanism in one preferred embodiment, the tongue lug comprises a flange, the flange is widened at an end distal from the housing. Each groove is machined to receive the widened flange so as to form a close fitting joint when the tongue is snapped into the groove. The joints tightly connect the housings of adjacent underdrain blocks so that the tightly connected housings form a contiguous floor for the filter system thereby substantially avoiding uplift during a backwash phase.

In another preferred embodiment of the snap-locking mechanism, the lugs comprise wedge-shaped lugs that are integral with and project from the side walls. The first side wall comprises a first set of wedge-shaped lugs that project downward toward the bottom wall, each downward projecting lug forming a notch between the lug and the side wall. The second side wall comprises a second set of wedge-shaped lugs that project upward toward the top wall, defining a recess between the lug and the second side wall. Adjacent underdrain blocks are interconnected by the projecting lugs when the first set of wedge-shaped lugs is snapped into the second set of wedge-shaped lugs.

BRIEF DESCRIPTION OF THE DRAWINGS

FIG. 1 is a schematic of one embodiment of the present invention illustrating a tongue-in-groove interlocking mechanism.

FIG. 2 is an enlargement of one embodiment of the interlocking mechanism of FIG. 1.

FIG. 6 is an enlargement of one embodiment of the interlocking mechanism of FIG. 4.

DETAILED DESCRIPTION

Figure 3:
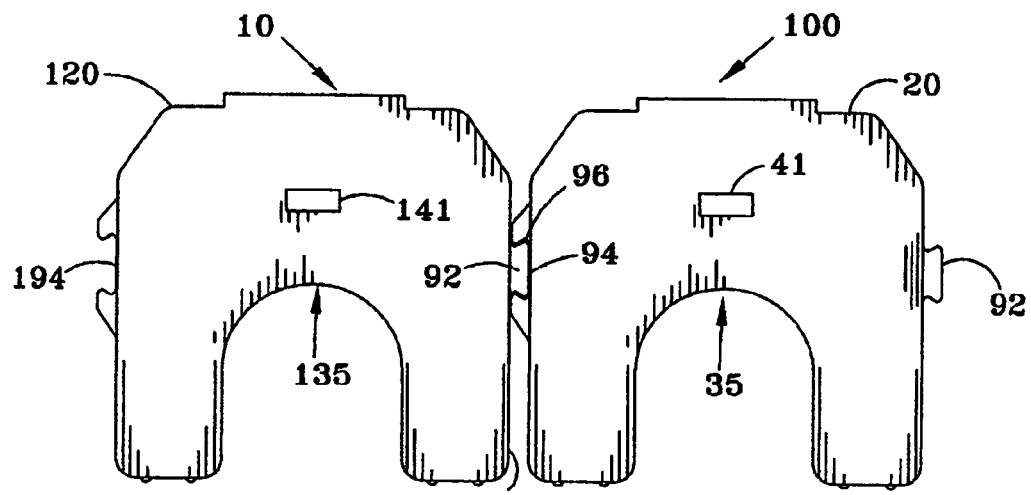
FIG. 3 is a schematic of a back view of FIG. 1 illustrating the interlocking mechanism and guide system.

Generally, the underdrain block of this invention both supports the filter media, and separates the filter media from the effluent filtrate. The block comprises an interlocking mechanism for the purpose of connecting adjacent blocks, thereby reducing lift off of the underdrain blocks from the filter floor during backwash. The advantageous element of the invention comprises a snap locking mechanism, which interlocks one block with an adjacent block when snapped into place thereby forming a tight joint that prevents slippage during backwash. The securely interlocked blocks counteract the upward forces of backwash pressure with the combined weight of an entire row of underdrain blocks. Shut down of the filter system for repairs is considerably reduced.

The blocks of one embodiment of the present invention can be constructed of various plastics, which may be filled with concrete or other heavy materials to prevent buoyancy of the underdrain blocks. Underdrain blocks are used as a base of support for the filter media in a filter bed system. The blocks form a solid base for the filter media bed, but are shaped in such a way as to allow piping to run underneath the blocks while being protected from the weight of the filter media. Underdrain blocks are generally rectangular shaped. The blocks are placed in the bottom of large water filtration systems where they are aligned side by side in rows.

Referring to the drawings, FIG. 1 illustrates one preferred embodiment of this invention comprising a tongue-in-groove snap locking mechanism. Two underdrain blocks are shown side by side with a tongue-in-groove lock mechanism. Broadly, the preferred underdrain block 10, 100 comprises a housing 20, 120. The housing 20, 120 has a top wall 30, 130, a bottom wall 35, 135, a first end wall 42, 142, a second end wall, illustrated in FIGS. 3, 45, 145, and side walls 46, 48, 146, 148. The end walls 42, 142, 45, 145 and the side walls 46, 48, 146, 148 connect the top wall 30, 130 to the bottom wall 35, 135. The bottom wall forms two lateral rows of support legs 84, 184 configured to straddle the infrastructure (piping and laterals not shown). The support legs 84, 184 form a conduit where piping is protected from the weight of the filter media. The weight of the filter media is supported through the support legs 84, 184 straddling the piping.

One or more snap-locking mechanisms 90 are located on the side walls 46, 48, 146, 148 so that adjacent underdrain blocks 10, 100 are interconnected by the snap-locking mechanisms 90 when snapped into place. The snap locking mechanisms 90 function to hold the position of the underdrain blocks while the filter media system is in a backwash mode. Underdrain blocks have a tendency to become buoyant and move due to the upward pressure of the backwash air and water introduced. The snap locking mechanisms 90 prevent the movement of the underdrain blocks by interlocking a lateral row of underdrain blocks and using the weight of the entire row of blocks to counteract the upward force of the backwash air, thereby reducing the downtime associate with repositioning shifted blocks.

In one embodiment of the present invention, as shown in FIGS. 1 and 2, the snap locking mechanism 90 comprises a set of tongue-in-groove lugs 90 projecting from the side walls 46, 48, 146, 148. The tongue-in-groove lugs 90 are integral with the side walls 46, 48, 146, 148. The width of the underdrain block 10, 100 varies from the top wall 30, 130 to the bottom wall 35, 135 and the tongue-in-groove lugs 92, 94, 192, 194 are aligned on the side walls 46, 48, 146, 148 along a horizontal axis, and positioned along a vertical plane at a point adjacent to the greatest width of the underdrain block 10, 100. The first side 46, 146 wall comprises one or more tongue lugs 92, 192 and the second side wall 48, 148 comprises one or more groove lugs 94, 194. Preferably, the tongue lug 92, 192 is machined to snap lock into the groove of the groove lug 94, 194. In this embodiment, the tongue lug 92, 192 comprises a flange 93 widened at an end distal from the housing 20, 120. In one embodiment, the flange 93 can be rounded. Each groove 94, 194 is machined to receive the widened flange 93 so as to form a close fitting joint 96 when the tongue lug 92, 192 is mated with the groove 94, 194.

The close fitting joints 96 tightly connect the housings 20, 120 of adjacent underdrain blocks 10, 100. The tightly connected housings 20, 120 form a contiguous floor for the filter system, thereby substantially avoiding uplift during a backwash phase.

Figure 4:
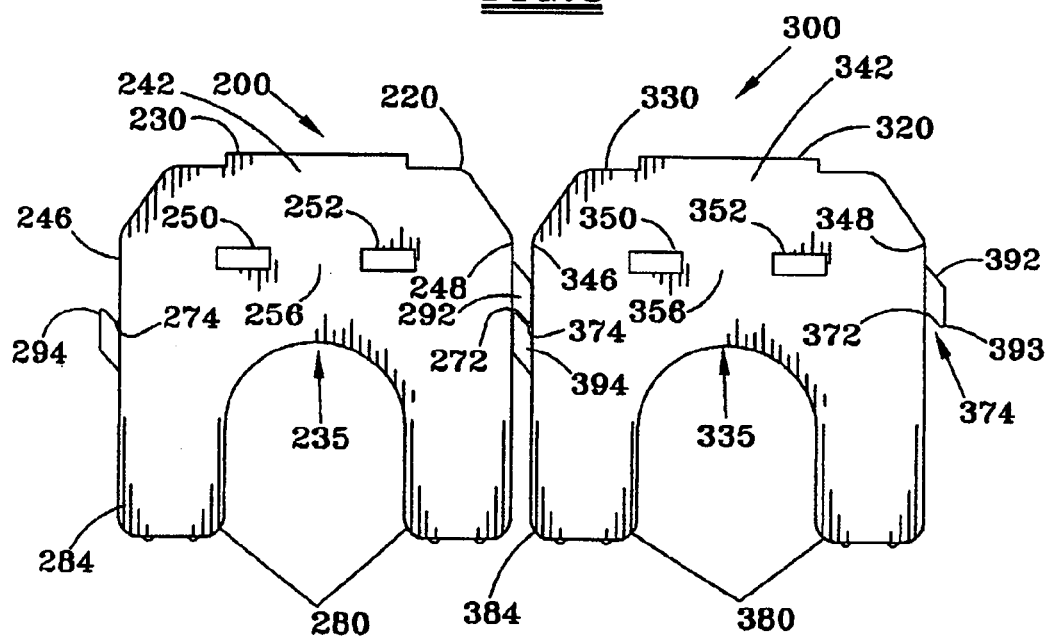
FIG. 4 is a schematic of another embodiment of the interlocking mechanism of the invention.
Figure 5:
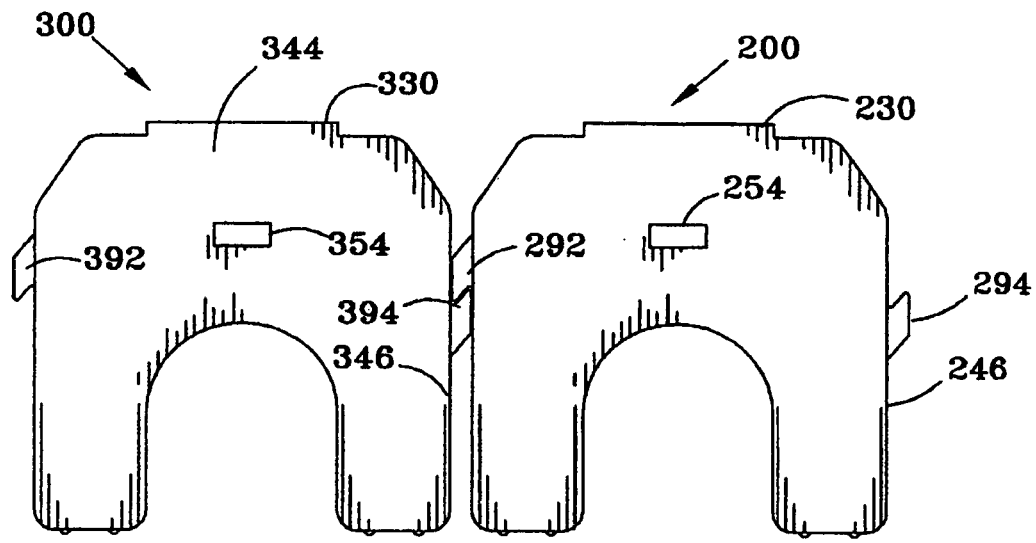
FIG. 5 is a schematic of a back view of FIG. 4 illustrating the interlocking mechanism and guide system.
Figure 7:
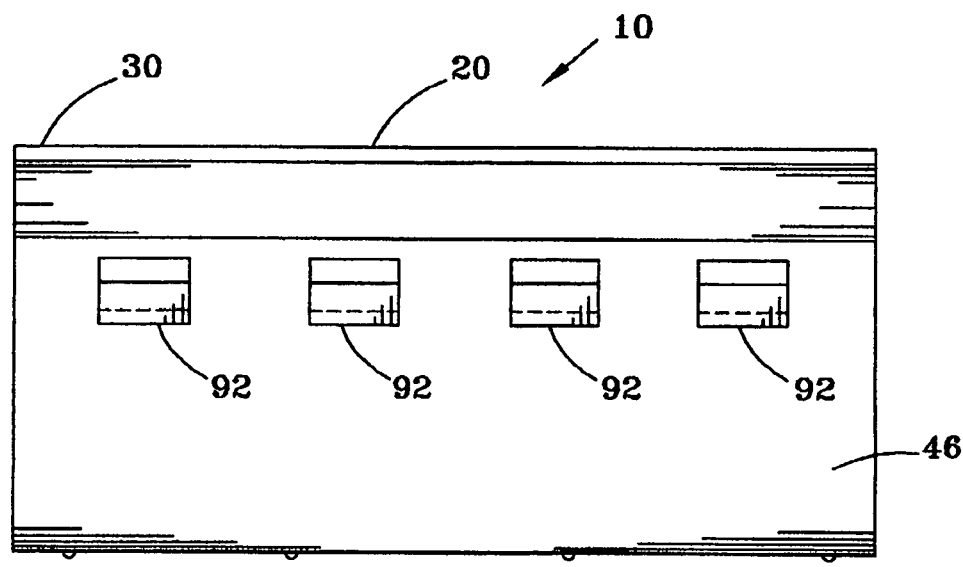
FIG. 7 is a side view of FIG. 1 illustrating the row of snap locking mechanisms.

As shown in FIGS. 1 and 4, the end walls of the underdrain blocks can comprise a first guide 43, 143 and a second guide 47, 147 which are used to align the blocks front to back in the formation of longitudinal rows. The second guide 47, 147 is adjacent to the first guide 43, 143. Both guides are positioned on the first end wall 42, 142. The first guide 43, 143 and second guide 47, 147 define a slot between them. FIGS. 3 and 5, illustrate the second end wall 45, 145. The second end wall 45, 145 comprises a node 41, 141. When the first end wall 42, 142 of a first underdrain block abuts the second end wall 45, 145, the node 41, 141 locks into the slot between the first 43, 143 and second guides 47, 147 to maintain the alignment of the longitudinal row of blocks.

Another embodiment of the invention as shown in FIGS. 4 and 5, illustrates a wedge-shaped snap locking system. In this embodiment, an underdrain block 200, 300 comprises wedge-shaped lugs 294, 292, 394, 392 that project from the side walls 246, 248, 346, 348. The underdrain block can comprise a width that varies from the top wall 30, 130 to the bottom wall 35, 135. The wedge-shaped lugs 292, 294, 392, 394 are aligned on the side walls 46, 48, 146, 148 along a horizontal axis and positioned along a vertical plane at a point adjacent the greatest width of the underdrain block. In this embodiment of the wedge-shaped snap lock mechanism 290, the underdrain block 200, 300 comprises a housing 220, 320. The housing 220, 320 has a top wall 230, 330, a bottom wall 235, 335, a first end wall 242, 342, a second end wall 244, 344 as illustrated in FIG. 5, and side walls 246, 248, 346, 348. The end walls 242, 342, 244, 344 and the side walls 246, 248, 346, 348 connect the top wall 230, 330 to the bottom wall 235, 335. The bottom wall forms two lateral rows of support legs 84, 184 configured to straddle the infrastructure (not shown). The support legs 284, 384 form a conduit where piping is protected from the weight of the filter media. The weight of the filter media is supported through the support legs 284, 384 straddling the piping.

Preferably, the first side wall 248, 348 of the underdrain block 200, 300 comprises a first set of wedge-shaped lugs 292, 392 projecting downward towards the bottom wall 235, 335. Each downward projecting, wedge-shaped lug 292, 392 defines a notch 272, 372 between it 292, 392 and the first side wall. The second side wall 246, 346 comprises a second set of wedge-shaped lugs 294, 394 projecting upward toward the top wall 230, 330, which defines a recess 274, 374 between the lug 294, 394 and the second side wall.

The downward projecting wedge-shaped lug 292, 392 can comprise an end 293, 393. In one embodiment, the end 293, 393 is tapered. Preferably, the end 293, 393 is machined to fit snuggly when snapped into the recess 274, 374 of the upward projecting wedge-shaped lug 294, 394. In one embodiment, each upward projecting wedge-shaped lug 294, 394 comprises a nib 295, 395, the nib 295, 395 is machined to fit snuggly when snapped into the notch 272, 372 of the downward projecting wedge-shaped lug 292, 392. The end 293, 393 and the nib 295, 395, in one embodiment, are rounded, as are the recesses 274, 374 and notches 272, 372 that receive the end 293, 393 and the nib 295, 395 respectively. The snug fit created by the end 293, 393 and the nib 295, 395 provide additional strength and stability to the interlock between the lugs.

In an alternate embodiment, the end 293, 393 and the nib 295, 395 The end 293, 393 may comprise a nub 400 machined to fit within the recess 274, 374 of the upward projecting lug 294, 394. The nib 295, 395 may comprise a lip 410 machined to fit within the notch 272, 372 of the downward projecting lug 292, 392.

In one embodiment, the wedge-shaped lugs 292, 294, 392, 394 are aligned on the side walls 246, 248, 346, 348 along a horizontal axis. The lugs are staggered above and below the horizontal axis so that when the first side wall 346 of one block is positioned adjacent the second side wall 248 of a second block, one or more wedge-shaped lugs below the horizontal axis 294, 394 form a secure joint when snapped into the notches 272, 372 of one or more wedge-shaped lugs above the horizontal axis 292, 392 and the wedge-shaped lugs above the horizontal axis 292, 392 are snapped into the recesses 274, 374 of the wedge-shaped lugs below the horizontal axis 294, 394.

In this embodiment, the underdrain block 200, 300 can also comprise a first guide 250, 350 adjacent to a second guide 252, 352. The guides are positioned on the first end wall 242, 342, and define a slot 256, 356 between them. A node 254, 354 is positioned on the second end wall 244, 344 so that when the first underdrain block abuts the second end wall 244, 344 of a second underdrain block. The node 254, 354 snap locks into the slot 256, 356 between the first and second guides 250, 252, 350, 352. The interlocking of the slot 256, 36 and the node 254, 354 serves to align the underdrain block to maintain their position within the rows and also help, to a lesser extent, to counteract the upward force of the water and air during the backwash procedure. This action prevents the movement of the underdrain blocks, and the costly repairs associated with repositioning the blocks.

The invention claimed is:

1. An underdrain block for a filter system comrising an infrastructure, the underdrain block comprising:
   a housing defining a cavity;
   the housing comprising a top wall, a bottom wall, a first end wall, a second end wall, a first side wall and a second side wall, the end walls and side walls connecting the top wall to the bottom wall;
   the top wall defining an opening into the cavity; and
   one or more snap-locking mechanisms on the side walls, the snap-locking mechanism comprising wedge-shaped lugs, integral with and projecting from the side walls;
   the snap locking mechanisms further comprising a first set of wedge-shaped lugs positioned on the first side wall, the lugs projecting downward towards the bottom wall, each downward projecting, wedge-shaped lugs along with the first side wall defining a notch;
   and a second set of wedge-shaped lugs positioned on the second side wall, the second set of lugs projecting upward towards the top wall, each of the upward, wedge-shaped lugs along with the second side wall defining a recess so that adjacent underdrain blocks are interconnected by the projecting lugs when the first set of lugs is snapped into the second set of lugs;
   wherein each downward projecting lug comprises an end, the end machined to fit snuggly when snapped into the recess of the upward projecting lug and each upward projecting lug comprises a nib, the nib comprising a lip machined to fit within the notch of the downward projecting lug.

* * * * *